United States Patent
Gao et al.

(10) Patent No.: US 8,328,360 B2
(45) Date of Patent: Dec. 11, 2012

(54) RETRO-REFLECTIVE LIGHT DIFFUSING AUTOSTEREOSCOPIC 3D DISPLAY SYSTEMS

(75) Inventors: Chunyu Gao, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 462 days.

(21) Appl. No.: 12/418,137

(22) Filed: Apr. 3, 2009

(65) Prior Publication Data
US 2010/0253915 A1 Oct. 7, 2010

(51) Int. Cl.
- *G03B 21/00* (2006.01)
- *G03B 21/26* (2006.01)
- *G06T 15/00* (2006.01)

(52) U.S. Cl. .............................. 353/7; 353/94; 345/419
(58) Field of Classification Search .................. 353/7, 8, 353/20, 78, 94, 98; 359/28, 443, 449, 458, 359/487.04, 599; 345/419
See application file for complete search history.

(56) References Cited

U.S. PATENT DOCUMENTS

| | | | |
|---|---|---|---|
| 5,606,458 A * | 2/1997 | Fergason | 359/630 |
| 5,621,572 A | 4/1997 | Fergason | |
| 5,671,992 A | 9/1997 | Richards | |
| 6,055,013 A | 4/2000 | Woodgate et al. | |
| 6,075,557 A | 6/2000 | Holliman et al. | |
| 6,323,999 B1 * | 11/2001 | Ueda et al. | 359/443 |
| 6,543,899 B2 | 4/2003 | Covannon et al. | |
| 6,752,498 B2 | 6/2004 | Covannon et al. | |
| 6,963,224 B2 | 11/2005 | Togino | |
| 6,999,071 B2 * | 2/2006 | Balogh | 345/419 |
| 7,239,293 B2 | 7/2007 | Perlin et al. | |
| 2003/0156260 A1 * | 8/2003 | Putilin et al. | 353/10 |
| 2007/0064098 A1 | 3/2007 | Tran | |

OTHER PUBLICATIONS

Otsuka, R., et al., "Transport: All-Around Display System for 3D Solid Image", Proc. of the ACM Symposium on Virtual Reality Software and Technology, Hong Kong 2004, pp. 187-194.

Otsuka, R., et al., "Transport: A Novel Approach to the Display and Transmission of 360 Degrees-Viewable 3D Solid Images", IEEE Transactions on Visualization and Computer Graphics, vol. 12, No. 2, Mar./Apr. 2006, pp. 178-185.

Moore, John R., et al., "Time-multiplexed color autostereoscopic display", SPIE Symposium on Stereoscopic Displays and Applications VII, San Jose, CA Jan. 28-Feb. 2, 1996, Published in Proc. SPIE vol. 2653, pp. 1-9.

Jones, A., et al., "Rendering for an Interactive 360° Light Field Display", ACM Transactions on Graphics (TOG), v. 26 n 3, Jul. 2007, pp. 1-10.

Matusik, W., et al., "3D TV: A Scalable System for Real-Time Acquisition, Transmission, and Autostereoscopic Display of Dynamic Scenes", ACM Transactions on Graphics 23, Aug. 3, 2004, pp. 814-824.

Surman, P., et al., "Head Tracked Single and Multi-user Autostereoscopic Displays", Proceedings of 3rd European Conference on Visual Media Production 2006, pp. 144-152.

Van Berkel, C., et al., "Characterization and optimization of 3D-OLCD module design", Proceedings of SPIE, vol. 3012, 1997, pp. 1-8.

(Continued)

*Primary Examiner* — Thanh Luu
*Assistant Examiner* — Renee Naphas

(57) ABSTRACT

Aspects of the present invention involve novel display screens comprising light diffusion and retro-reflectivity. In embodiments, a retro-reflective light diffusion screen can be used to generate a three-dimensional autostereoscopic display by generating a plurality of viewing windows wherein each viewing window depicts a unique perspective image view.

20 Claims, 9 Drawing Sheets

OTHER PUBLICATIONS

Peterka, T., et al., "Advances in the Dynallax Solid-State Dynamic Parallax Barrier Autostereoscopic Visualization Display System", IEEE Transactions on Visualization and Computer Graphics, vol. 14, Issue 3, May-Jun. 2008, pp. 487-499.

Cruz-Neira, C., et al., The CAVE: audio visual experience automatic virtual environment, Communications of the ACM, v. 35, n. 6, Jun. 1992, pp. 64-72.

Eichenlaub, J., A Lightweight, Compact 2D/3D autostereoscopic LCD backlight for games, monitor and notebook applications, Proceedings of the SPIE, vol. 3295, 1998.

Woodgate, G.J., et al., "Flat panel autostereoscopic displays—characterisation and enhancement", Proceedings of the SPIE, vol. 395, 2000, pp. 153-164.

* cited by examiner

RETRO-REFLECTIVE LIGHT DIFFUSING AUTOSTEREOSCOPIC 3D DISPLAY SYSTEMS

BACKGROUND

A. Technical Field

The present invention pertains generally to displays, and relates more particularly to autostereoscopic three-dimensional (3D) displays.

B. Background of the Invention

Three-dimensional movies and television are becoming increasingly more popular. With advances in technology, such as high-definition (HD) television, consumers desire more and better features. According to the "2008 3D Television Report" released in May 2008 by Insight Media, 3D may soon be an add-on feature of high-definition television. Many display manufacturers are developing their own 3D display technologies to meet these market demands.

In the current 3D market, traditional standard two-view stereo remains as the dominant implementation. For example, head mounted displays are widely used in the military training and research community, glass-based projection displays play a key role in the large form 3D display, such as the CAVE® system and PowerWall systems of Mechdyne Corporation, as well as 3D cinemas. However, the requirement of wearing a helmet or glasses limits the use of the 3D technologies. As an alternative solution, autostereoscopic display technologies have attracted increasing attention. Autostereoscopic displays use special light directing devices to create separate viewing windows in the user's space, which allow the user to see 3D images without glasses. Since the designated viewing windows form a viewing space which is significantly larger than the size of the human eye, users can move their heads freely as long as their eyes are within the viewing space.

Current stereoscopic methods used to produce the viewing windows include parallel-barrier-based displays and lenticular-based displays. However, these autostereoscopic display technologies have significant limitation.

For example, parallel-barrier-based displays suffer from several limitations. First, because parallel-barrier displays use light blocking to produce viewing windows, only a small amount of light emitted from each pixel passes through the barrier window. Second, cross-talk between views can be significant. Crosstalk refers to the overlap of viewing areas, which results when one eye sees the image intended for the other eye. When the crosstalk is significant, the brain cannot perceive the stereo effect or cannot perceive it correctly. Third, the use of small apertures in parallel-barrier-based displays can cause diffraction. This problem becomes more acute as the display resolution increases. As the display resolution increases, the barrier aperture size must be decreased, which causes more severe diffraction effects. Fourth, parallel-barrier-based displays typically suffer from limited resolution. For a display with n views, the resolution of the individual view is essentially 1/n of the original display resolution. Because the views have to divide the resolution of the original display, a parallel-barrier-based display's resolution is limited by the original resolution of the display, which is also limited by diffraction as well as the display manufacturer's capability. Fifth, since each view only sees one pixel column out of n associated with one barrier window, there are many dark pixels lines in each view, which creates a "picket fence effect" in the monocular image. Finally, parallel-barrier-based displays typically suffer from having a limited number of viewing windows. In order to generate more viewing windows, the dark slits have to be wider while the slit windows remain unchanged. Obviously, it is impossible to infinitely increase the number of viewing windows without aggregating the artifacts such as reduced brightness and picket fence effect.

Although lenticular-based displays offer some improvements over parallel-barrier-based displays, the use of lenticular sheets also has important drawbacks. Lenticular-based displays offer higher resolution compared with barrier slits; however, it is more difficult and costly to make high quality lenticular sheets than to make simple black-white barriers. In fact, the quality of the display is directly related to the quality of the lenticular sheet used in the display. Aligning a lenticular sheet with a display also requires significant effort. Furthermore, lenticular-based displays also suffer from problems that plague parallel-barrier-based displays, such as cross-talk between view windows, dark line problem, limited resolution, and limit number of viewing windows.

SUMMARY OF THE INVENTION

Accordingly, what is needed are systems and methods that provide better displays, particularly better displays that can be used for autostereoscopic displays.

Aspects of the present invention involve the use of light diffusion and retro-reflectivity to generate novel display screens. In embodiments, a retro-reflective light diffusion screen can be used to generate autostereoscopic displays by generating a plurality of viewing windows. In embodiments, each viewing window depicts a perspective image view and a 3D image can be views by viewing one perspective image view from one viewing window with one eye and by viewing another perspective image view from another viewing window with the other eye.

In embodiments, a display screen system comprising a screen that has a two-dimensional retro-reflective surface and a diffusion surface. The diffusion surface is configured with a large diffusion angle in a first direction and a small diffusion angle in a second direction. For the display screen, the first direction is preferably the vertical direction and the second direction is preferably the horizontal direction. The diffusion surface is also configured to receive an image reflected from the two-dimensional retro-reflective surface and to diffuse the image to form a viewing window corresponding to the image.

The display screen system can also include a plurality of projectors. Each projector has a unique position and is configured to project an image with a unique perspective view onto the screen to form a unique viewing window corresponding to the projected image. Thus, the display system forms a plurality of viewing windows corresponding to a plurality of images projected by the plurality of projectors. A user can view a three-dimensional image by viewing a first perspective image with one eye at a first viewing window selected from the plurality of viewing windows and by viewing a second perspective image with the other eye at a second viewing window from the plurality of viewing windows.

In embodiments, the display screen system also comprises a beamsplitter positioned in an optical path between at least one of the plurality of projectors and the screen to direct a projected image to the screen and to direct the projected image reflected from the screen to a location to form a viewing window that is spatially separate from the at least one of the plurality of projectors. Such configurations remove the projector as an obstacle in the viewing window.

In embodiments, the display system also includes a second screen retro-reflective light diffusing screen positioned at an optically mirror-conjugated position relative to the first screen to increase the brightness of the image at a viewing window.

In embodiments, the display system includes a polarization-sensitive beamsplitter positioned in an optical path between at least one of the plurality of projectors and the screen to direct a projected image to the screen and a quarter-wave plate positioned in an optical path between the screen and the beamsplitter.

In embodiments, the display system includes a computing device communicatively coupled to the plurality of projectors to coordinate projection of images. The computing device may also include one or more datastores for storing images to be projected. It should be noted that the images to be projected may be still images, video images, or both.

Embodiments of the present invention also include methods for making an autostereoscopic display system according to teachings presented herein. For example, in embodiments, an autostereoscopic display system can be formed by positioning a retro-reflective light diffusing screen to receive projected images from a plurality of projectors. Each projector has a unique position and is configured to project an image with a unique perspective view onto the screen to form a viewing window corresponding to the projected image. A plurality of viewing windows are formed corresponding to the plurality of images projected by the plurality of projectors. The plurality of viewing windows are positioned such that a user can view a three-dimensional image by viewing a first perspective image with one eye at a first viewing window selected from the plurality of viewing windows and by viewing a second perspective image with another eye at a second viewing window.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
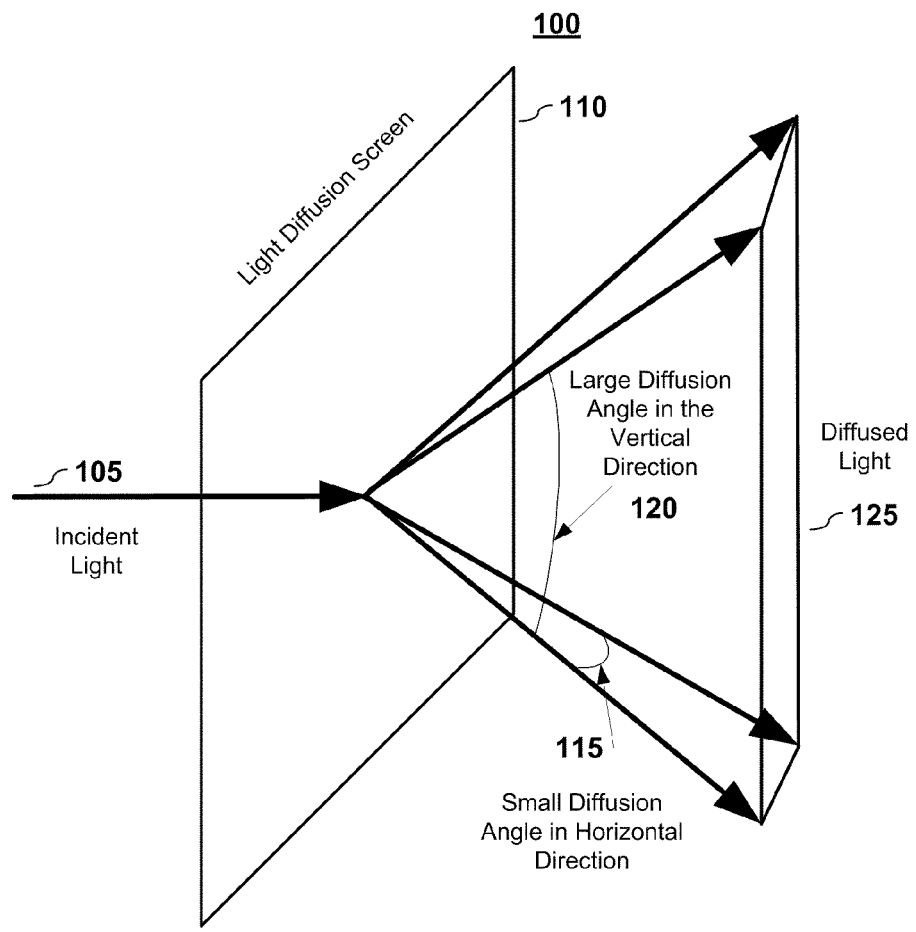
FIG. 1 illustrates the operation of a light diffusion screen according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways. Accordingly, the examples described below are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall also be understood that the terms "image" or "images" as used herein shall mean still images, video images, or both.

A. Overview

Most stereoscopic viewing techniques rely on binocular parallax cues to generate a three-dimensional (3D) image. Binocular parallax refers to seeing a stereo image pair (i.e., two different perspectives) of the same 3D object or objects. A head mounted display is one of such viewing device, in which the user sees two separate stereo images through two separated optical paths. Anaglyphic glass, shutter glass, and polarized glass are widely used to separate the stereo images displayed on a single screen or printed on the paper.

Autostereoscopic display techniques also rely on parallax depth cues. However, instead of separating the stereo views with glass in front of the user's eyes, most of autostereoscopic displays try to control the light path in display space to generate viewing windows in the user's space. In each viewing window, only one monocular image can be observed. The viewing windows further form viewing zones. Since the size of the viewing zone is significantly larger than the size of a human eye, the user can freely move his/her head within the viewing zone. Most of the existing autostereoscopic display systems are based on either parallel-barrier techniques or lenticular techniques.

1. Parallel-Barrier-Based Display

The fundamental design using a parallel barrier is to place strips to block light emitted from the display. A black-white mask grid is typically placed in front of the display. Each small white grid acts as a pinhole which maps pixels into the viewing space and allows a user to see the pixels from certain viewing angle (i.e., creating a viewing window), while the black grid blocks the neighbor pixels from that viewing angle. As a result, in a left viewing window, the user sees one set of pixels on the display, and in a right viewing window, the user sees the other set of pixels on the display. The left viewing window and the right viewing window together form one viewing zone. More than one viewing zone can be formed. Also, by increasing the resolution of the display and associating more pixels to each barrier slits, multiple viewing windows can be created within a single viewing zone.

As previously noted, parallel-barrier-based displays have several drawbacks. These drawbacks include: reduced brightness, cross-talk between views, diffraction effect caused by a small window, limited resolution, picket fence effect in the monocular image, image flipping artifact when crossing a viewing zone, and a limited number of viewing windows.

First, because parallel-barrier-based displays use a light block strategy, only a small amount of light emitted from each pixel passes through the barrier window. Thus, the brightness of the viewed image is reduced. Attempts to reduce the brightness problem have included placing the barrier mask behind the display. The light is modulated by the barrier before reaching the display pixels.

Second, cross-talk between views can be significant. Crosstalk refers to the overlap of viewing areas, which can result in one eye seeing the image intended for the other eye. When the crosstalk is significant, the brain cannot perceive the stereo effect or cannot perceive it correctly. Attempts to minimize the crosstalk artifact involve choosing a barrier pitch for the barrier mask or placing the barrier behind the display.

Third, the use of small apertures in parallel-barrier-based displays can cause diffraction. This problem becomes more acute as the display resolution increases. As the display resolution increases, the barrier aperture size must be decreased, which causes more severe diffraction effects. Thus, the aperture size of the barrier is limited by the diffraction limit.

Fourth, parallel-barrier-based displays typically suffer from limited resolution. For a display with n views, the resolution of the individual view is essentially 1/n of the original display resolution. Because the views have to divide the resolution of the original display, a parallel-barrier-based display's resolution is limited by the original resolution of the display, which is also limited by diffraction as well as the resolution that can be achieved by the display manufacturer.

Fifth, since each view only sees one pixel column out of n associated with one barrier window, there are many dark pixels lines in each view. For a two-view case, the dark line is a single pixel width, interlacing in these bright pixels. The dark pixel lines create a "picket fence effect" in the monocular image. Attempts to reduce the picket fence artifact involve placing the barrier lines at an angle with respect to the pixel column of the display.

Sixth, these displays can suffer from image flipping artifact. The imaging flipping artifact is caused by the improper alignment of a user's eyes with the viewing windows. In the two-view display systems, a user will see a flipped set of stereo images if the user's left eye is in a right viewing window and the user's right eye is in a left viewing window. For a multiple-view display system, such flipping artifacts happen when a user crosses a viewing zone.

Finally, parallel-barrier-based displays typically suffer from having a limited number of viewing windows. In order to generate more viewing windows, the dark slits have to be wider while the slit windows remain unchanged. It is impossible to increase the number of viewing windows without increasing artifacts, such as reduced brightness and picket fence effect.

2. Lenticular-Based Displays

As noted above, one drawback of parallel-barrier-based displays is low brightness due to the narrow vertical slits of the barrier. One solution to this problem is to use lenses to improve the light gathering. One form of lens that is used is a lenticular sheet, which contains a set of cylindrical lenses placed side-by-side. To use a lenticular sheet for displaying 3D images, the sheet is vertically aligned with a 2D display. Similar to parallel-barrier displays, if aligning two sets of pixels (e.g., left eye pixels and right eye pixels), two viewing windows can be created to form one viewing zone. Multiple viewing zones (with L & R viewing windows) can also be created. If aligning multiple pixels with each lens, multiple viewing windows can be created in one viewing zone. Since the lenses in the lenticular sheet are in a cylindrical shape, only horizontal parallax is created. In addition to an improvement over parallel-barrier-based displays with respect to light-gathering ability, the lenticular sheet also can offer higher resolution comparing with barrier slits.

Although lenticular-based displays have better brightness and resolution possibilities as compared to parallel-barrier-based displays, lenticular-based displays present their own disadvantages. First, the quality of the display is dependent upon having a high quality lenticular sheet. However, it is significantly more difficult and costly, particularly as compared to barrier masks, to manufacture high quality lenticular sheets. Additionally, aligning a lenticular sheet with a display also requires significant effort. Furthermore, lenticular-based displays also suffer from problems that plague parallel-barrier-based displays, such as cross-talk between view windows, picket fence problem, limited resolution, image flipping, and limited number of viewing windows.

3. Light Diffusion Based Displays

A third type of multiple-view 3D display uses light shaping diffuser (LSD) technology. Examples of devices utilizing light shaping diffusers include a light-field display called HoloViZo™ developed by Holografika of Budapest, Hungary and a 3D light-field display developed by the Institute for Creative Technologies at the University of Southern California. The light shaping diffuser is a one-dimensional light diffuser which is used for optical communication device and LCD display backlighting. When illuminated by a projector, the light shaping diffuser has small diffusion in the horizontal direction and large diffusion in the vertical direction Holografika takes advantage of the one-dimensional diffusion property in its HoloVizo™ display. The display uses a number of projectors that illuminate a LSD screen. In the horizontal cross-section view, a viewer can only see one very thin slit of images from each projector, assuming that the screen diffuses light in the vertical direction only. To generate one viewing perspective, these thin slits from different projectors have to be mosaiced together. Therefore, the display requires many projectors to work together. For the HoloVizo™ display system, as many as 50 projectors are used for the prototype. Assuming a horizontal diffusion angle of 1 degree, it requires about 60 projectors to generate a 60 degree field-of-view multiple-view display.

The light-field display developed by the Institute for Creative Technologies at the University of Southern California consists of a high-speed video projector, a spinning mirror covered by a holographic diffuser, and field-programmable-gate-array circuitry to decode specially rendered Digital Visual Interface (DVI) video signals. The high-speed video projector and a spinning mirror covered by a holographic diffuser generate a 360 degree view. The light-field display developed by the Institute for Creative Technologies at the University of Southern California has similar properties as the HoloViZo™ display.

Although these displays do not share all of the drawbacks of the parallel-barrier-based and lenticular-based displays, there are some inherent problems with these approaches. For example, there can be crosstalk problem, difficult system calibration, and extra-cost for rendering.

First, for the HoloViZo™ display, there can be crosstalk problems. The crosstalk artifact can be introduced by the light diffuser. An ideal diffuser should be a perfect low pass filter (i.e., perfect rectangular). However, the actually material has a Gaussian-like diffusion pattern. As a result, there can be cross-talk between two neighbor thin slits, which could significantly blur the images or generate a zigzag image.

Second, both systems require extremely specialized and complex components and require complex system calibration. For example, since the images in the HoloViZo™ display are mosaiced from image segments of many projectors, these projectors must be properly aligned and calibrated. The light-field display developed by the Institute for Creative Technologies at the University of Southern California also requires specialized equipment and specialized set-up.

Finally, there are extra costs for image rendering. For the HoloVizo™ display, the rendering costs are caused, at least in part, by its special image mosaic requirement. The images displayed on the projectors are not the perspective images of a regular 3D movie or the images rendered by the standard OpenGL software. Thus, extra steps have to be taken to generate proper images for each projector. And, for the light-field display developed by the Institute for Creative Technologies at the University of Southern California, the system requires specially rendered DVI video signals.

B. Embodiments of Autostereoscopic Display

Embodiments of the present invention include using light shape diffusion with retro-reflection. Such configurations have several benefits over prior autostereoscopic displays. First, such systems can use full resolution of the projectors and can display bright images. Systems of the present invention generate each view image with only one projector and do not require mosaicing the views from multiple projectors when the user views images at the designated viewing location. Additionally, the images do not require specially rendered video signals. As a result, the special post-rendering processes mentioned above are not necessary. Compared with parallel-barrier-based and lenticular-based displays, the present systems do not suffer from the same resolution limits, are typically much brighter, and are theoretically able to create a large number of viewing windows. Additional benefits shall be apparent to one skilled in the art.

C. Retro-Reflective Vertical Light Diffusion Screen (RRVLD)

In embodiments, an autostereoscopic display of the present invention comprises two layers. The first layer comprises a one-dimensional (1D) light diffusion material that has a small diffusion angle in one direction and a large diffusion angle in the other direction. FIG. 1 depicts an example of a light diffusing material according to embodiments of the invention.

As showing in FIG. 1, an incident light ray 105 that passes through the light diffusing material 110 is diffused by a small angle 115 in the horizontal direction but by a large angle 120 is the vertical direction. For 3D display applications, a small diffusion in the horizontal direction is preferred, while in the vertical direction a large diffusion is preferred. Therefore, this type of diffusion screen can be referred to as a vertical light diffusion screen.

Figure 2:
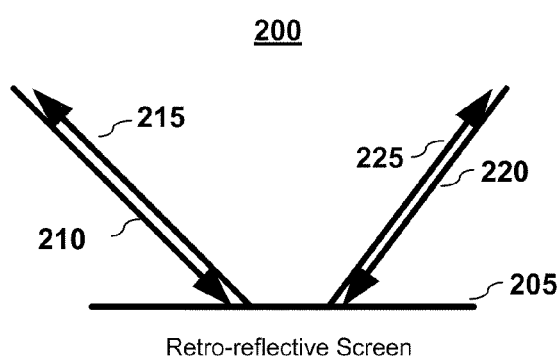
FIG. 2 illustrates the operation of a retro-reflective screen according to various embodiments of the invention.

The second layer of the screen is a retro-reflective material, which reflects a light ray back in the incident direction. FIG. 2 depicts an example of a retro-reflective material and the interaction with light rays. An incident light ray 210 or 220 strikes the retro-reflective material 205 and is reflected. The reflected light ray is reflected back at the same, or nearly the same, angle as the incident light ray. Thus, the incident light ray 210 has a retro-reflective ray 215 that is reflected back to along the direction of the incident ray 210. And, the incident light ray 220 has a retro-reflective ray 225 that is reflected back to along the direction of the incident ray 220.

Figure 3:
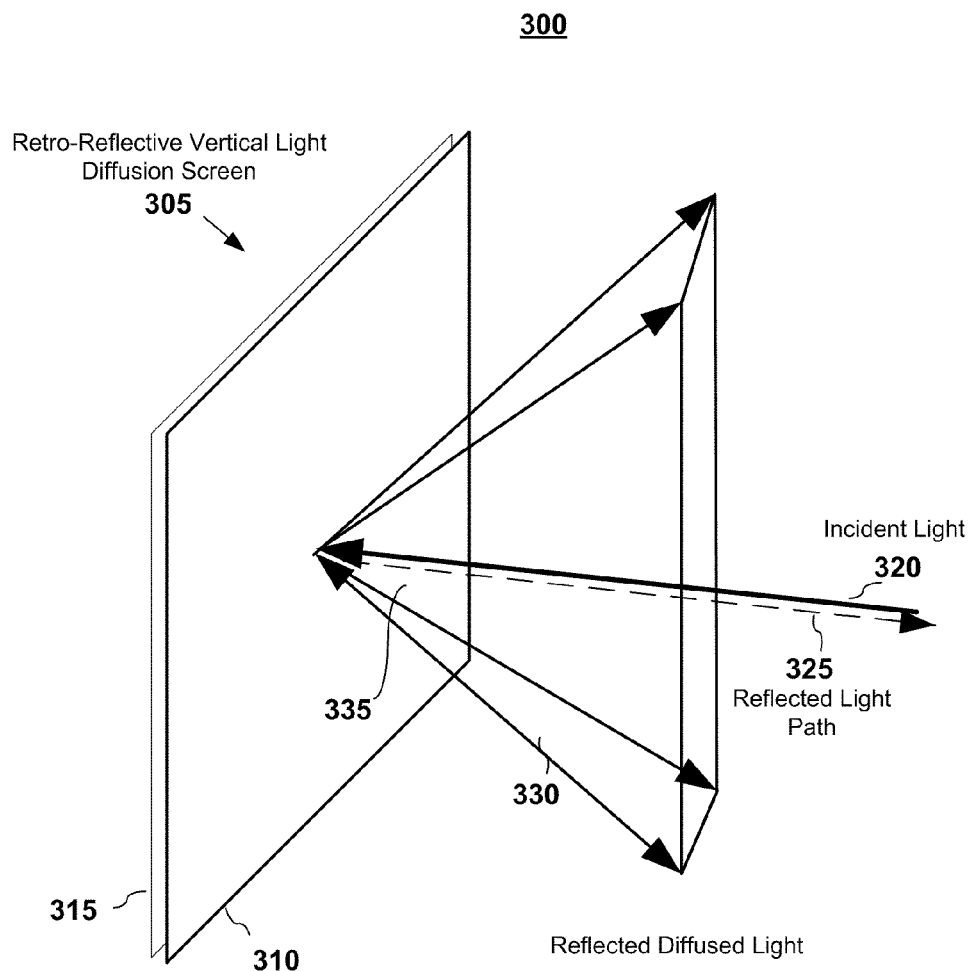
FIG. 3 illustrates the operation of a retro-reflective vertical light diffusion screen according to various embodiments of the invention.

FIG. 3 depicts a retro-reflective vertical light diffusion screen 300 according to various embodiments of the invention. The screen 305 illustrated in FIG. 3 is formed of a light diffusion material 310 combined with a retro-reflective material 315. In embodiments, a one-dimensional light diffusion material, such as Light Shaping Diffusers (LSD®) produced by Luminit LLC of Torrence, Calif., may be used. A light shaping diffusion material may have diffusion angles of 60°× 1°, although one skilled in the art shall recognize that other diffusion angles may be used. In embodiments of the 3D display system, the light shaping diffusion material is oriented with the 60° diffusion angle in the vertical direction and with the 1° diffusion angle in the horizontal direction. In embodiments, a retro-reflective material, such as 3M™ Scotchlite™ Reflective Material, produced by 3M Coporation of St. Paul, Minn. or the photoelectric control products, such as its P66 and AC1000 with metalized back produced by Reflexite Americas of New Britain, Conn., may be used.

As depicted in FIG. 3, light 320 directed toward the retro-reflective vertical light diffusion screen 305 passes through the diffusion material and is retro-reflected back to along its incident direction 325 (or substantially along the incident direction). The retro-reflected light is then diffused by the light diffusion material 310. The light diffusion material 310 is configured to diffuse the retro-reflected light a small amount in the horizontal direction 330 and a large amount into vertical direction 335. Thus, the resulting diffused light is in a fan shape after it passes through the diffusion material.

D. Embodiments of Display Systems

1. General Display System Embodiments

Figure 4:
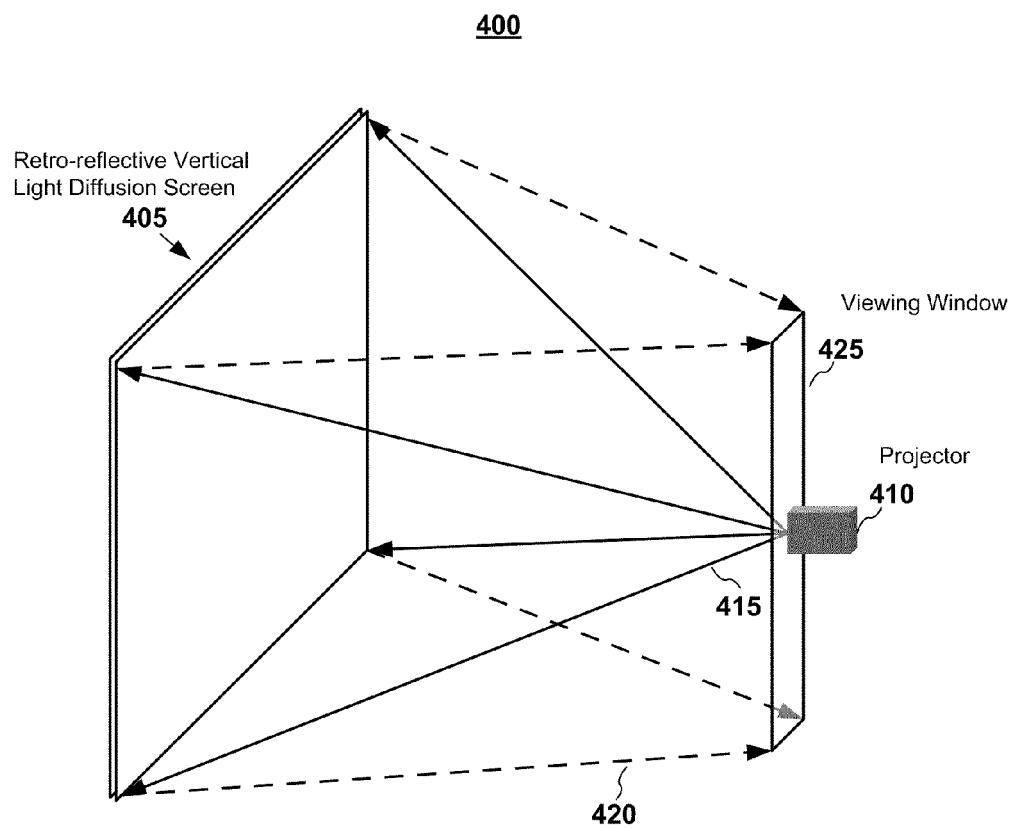
FIG. 4 illustrates a display system with a retro-reflective vertical light diffusion screen according to various embodiments of the invention.

FIG. 4 depicts a display system 400 according to various embodiments of the present invention. Shown in FIG. 4 is a retro-reflective vertical light diffusion screen 405 and a projector 410. The retro-reflective vertical light diffusion screen 405 is used as a display screen. The light rays 415 emitted from the projector are retro-reflected back to the projector 410 and create a viewing window 425 which overlaps with the projector. The screen 405 is configured such that the reflected light is diffused with a large diffusion angle in the vertical direction and with a small diffusion angle in the horizontal direction. Due to the vertical diffusion effect, the viewing window is a vertical slit centered with the aperture of the projection lens. The width of the slit 425 is a function of the horizontal diffusion angle of the screen, the distance from the projector, and the aperture size of the projection lens. The following equation sets forth the calculation for the width of the vertical slit:

$$W = D_a + 2 \cdot Z_p \cdot \tan\left(\frac{\omega}{2}\right),$$

where
W is the width of the slit;
$D_a$ is the aperture size of the projection lens;
$Z_p$ is the distance from the projector to the screen; and
$\omega$ is the horizontal diffusion angle of the screen.

It shall be noted that an advantage of having a large vertical diffusion angle is that the viewing window is extended. Without an extended viewing window, the viewing window would coincide with the projector lens, thereby making it not possible for an individual to view the reflected image. By extending the viewing window in a vertical direction, a user can view the image in the viewing window either above or below the projector 410.

Figure 5:
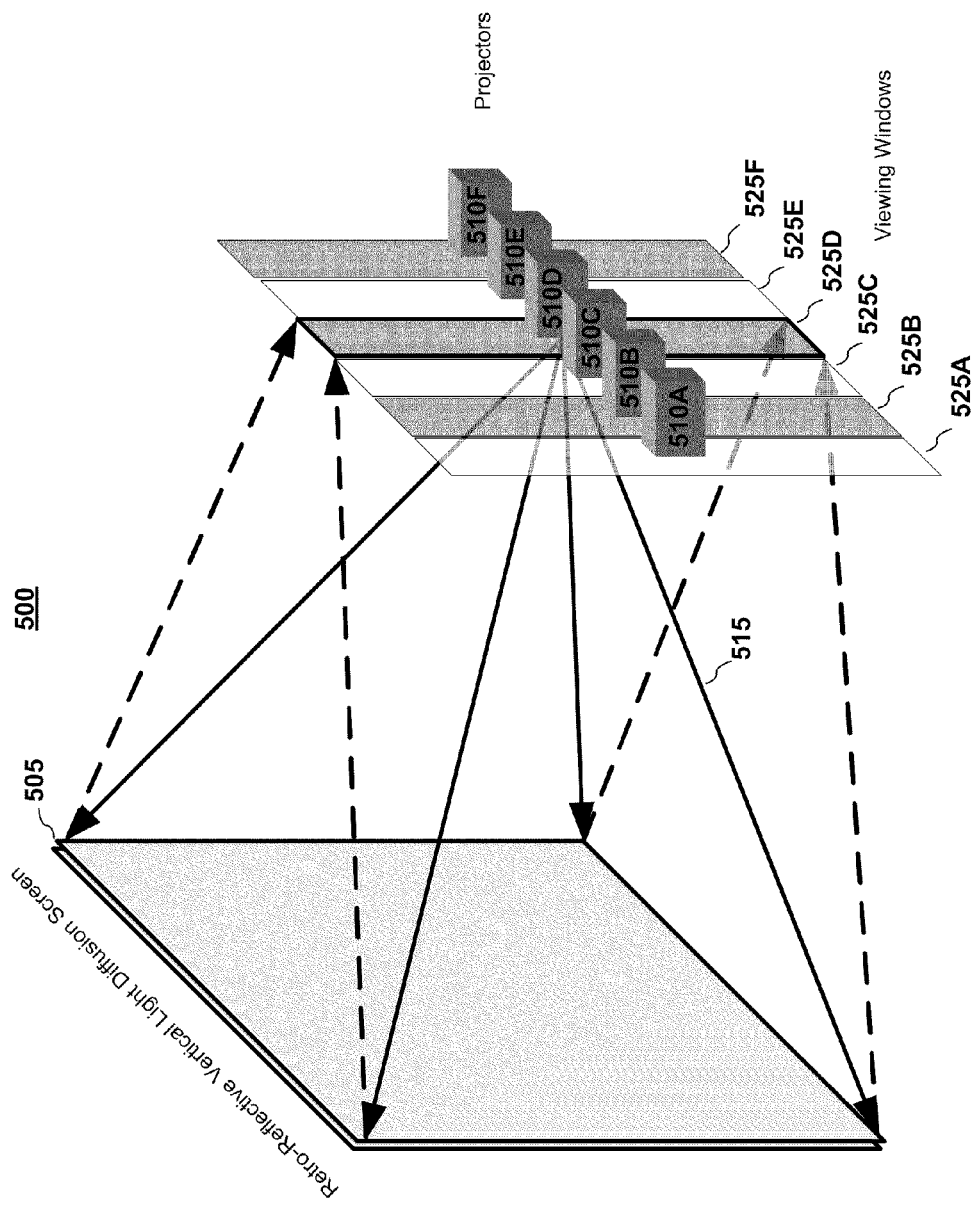
FIG. 5 illustrates a multi-projector display system with a retro-reflective vertical light diffusion screen according to various embodiments of the invention.

FIG. 5 depicts a 3D display system 500 according to various embodiments of the present invention. Shown in FIG. 5 is a retro-reflective vertical light diffusion screen 505 and a set of projectors 510A-F. It should be noted that although FIG. 5 depicts six projectors, additional or fewer projectors could be used. The retro-reflective vertical light diffusion screen 505 is used as the display screen in a similar manner as described with reference to FIG. 4. Namely, the light rays 515 emitted from a projector 510x are reflected back to the projector 510x and create a viewing window 525x overlapped with the projector. For example, the light from projector 510A is reflected and diffused by the screen 505 to form viewing window 525A. This result is same for each projector in the display system 500, wherein each projector 510A-F generates a corresponding viewing window 525A-F, respectively. Thus, by adding more projectors, more such viewing windows are created.

The display system depicted in FIG. 5 generated six distinct viewing windows. Each viewing window displays an image from a corresponding projector. By displaying a set of images captured from multiple perspectives on the screen through the projectors, a user can see 3D through these viewing slits or windows. For example, if a user views one image in one viewing window with one eye and views another perspective image in another viewing window with her other eye, then the user will perceive a 3D image. In embodiments, the width of a slot can be sufficiently small that a user does not perceive a monocular image by viewing the same image in the same viewing window with both eyes.

One skilled in the art shall recognize that there are several advantages to a display system of the kind depicted in FIG. 5. First, the images are bright. Due to the one-dimensional light diffusion, a user will see an image that is much brighter than the image on a regular diffusion screen or using other stereoscopic methods like parallel-barrier-based displays.

Second, the display screen can be configured into different shapes. Due to the retro-reflective property of the material, the screen shape could take arbitrary forms, such as regular planar, cylindrical shape, spherical shape, or almost any irregular shape. These shape variations do not affect the refocusing property of the retro-reflective screen.

Third, the display system is easily scalable. For example, more viewing windows can be generated by simply adding more projectors.

Fourth, the display system does not have the resolution limitations of prior solutions. Even though all the images are projected on the same screen, each image is only seen in the designated viewing window; therefore, the resolution can be as high as the resolution of the projector.

Fifth, the display system does not suffer from the picket fence effect. Because the user perceives one full resolution image from a single projector at each viewing window, there is no picket fence effect in the image.

Sixth, the display system does not suffer from an image flipping effect. The flipping effect occurs when a user moves his head across the viewing zones and perceives a right image in his left eye and a left image in his right eye. The display system does not have repeated viewing zones with specific stereo pair images and therefore does not have image flipping problems. Rather, each viewing window displays a perspective view image and any pair of images forms a 3D view. For example, in embodiments, the viewing windows may have a progression of perspective view images, wherein any two images form a 3D view.

Finally, the display system can potentially have an infinity number of viewing windows. Although theoretically the display system can generate an infinity number of viewing windows, the number of viewing windows that can be generated depends upon the horizontal diffusion angle of the diffusion material, the distance from the projector to the screen and the size of the projector.

2. Compact Design Embodiments

Figure 6:
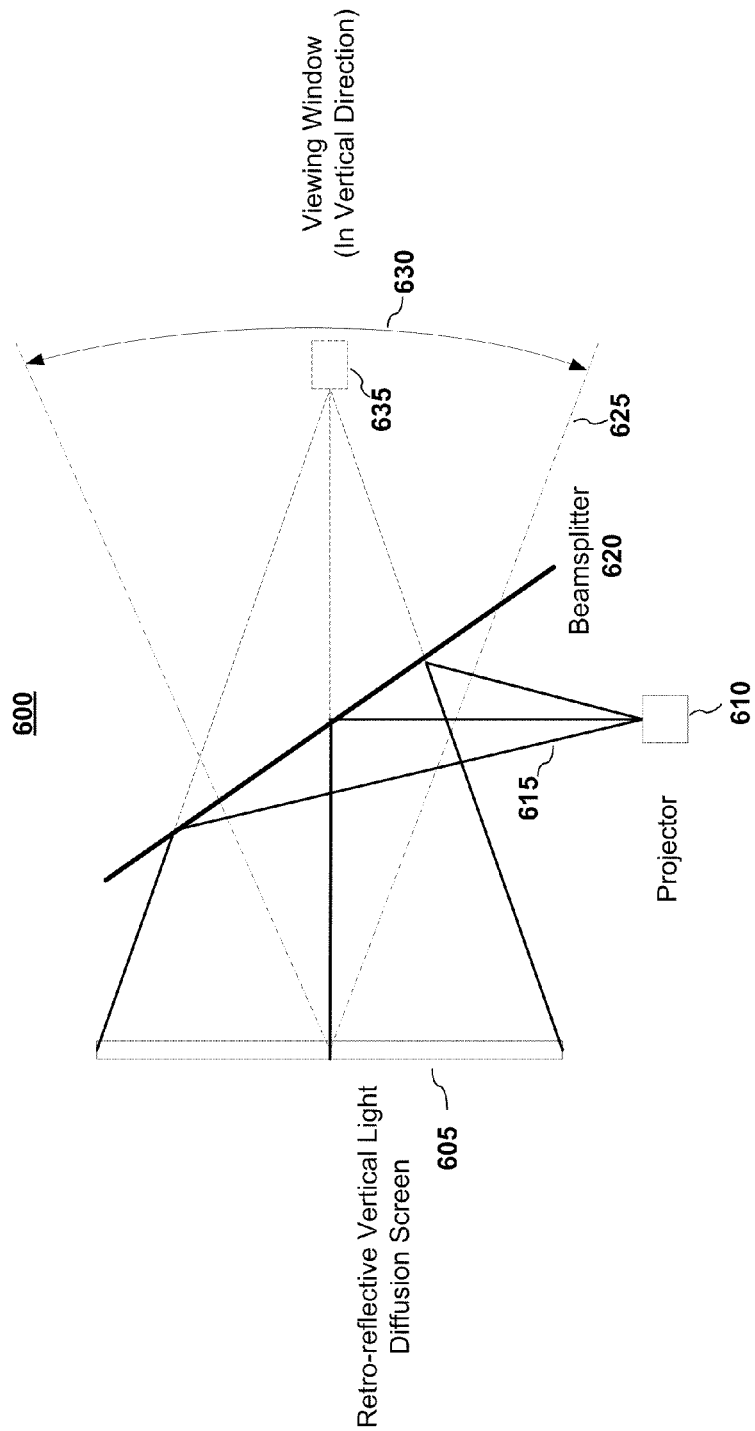
FIG. 6 illustrates an alternative embodiment of a display system with a retro-reflective vertical light diffusion screen according to various embodiments of the invention.

FIG. 6 depicts an alternative embodiment of a display system according to various embodiments of the invention. Illustrated in FIG. 6 is a more compact design for a display system 600. The depicted display system 600 comprises a retro-reflective vertical light diffusion screen 605 and a projector 610. Instead of having the projector 610 project an image 615 directly on the screen 605, the projector 610 projects an image onto a beamsplitter 620. The light reflects off the beamsplitter 620 or is split by the beamsplitter 620 onto the retro-reflective vertical light diffusion screen 605. The retro-reflected light, or at least a portion of the retro-reflected light, passes through the beamsplitter 620 to create a view window 630 where a virtual position of the projector 635 is located. It shall be noted that using a beamsplitter to fold the light path has at least two benefits. First, the view window 630 is not occluded by the projector since the view window is moved to a virtual location 635 of the projector. And second, the display system has a compact design. In embodiments, a first surface mirror could be inserted in the optical path to further fold the light path, if necessary. For example, a mirror can be used to bend the light path and allowing the projector to be moved closer to the screen.

3. Dual Screen Display System Embodiments

Figure 7:
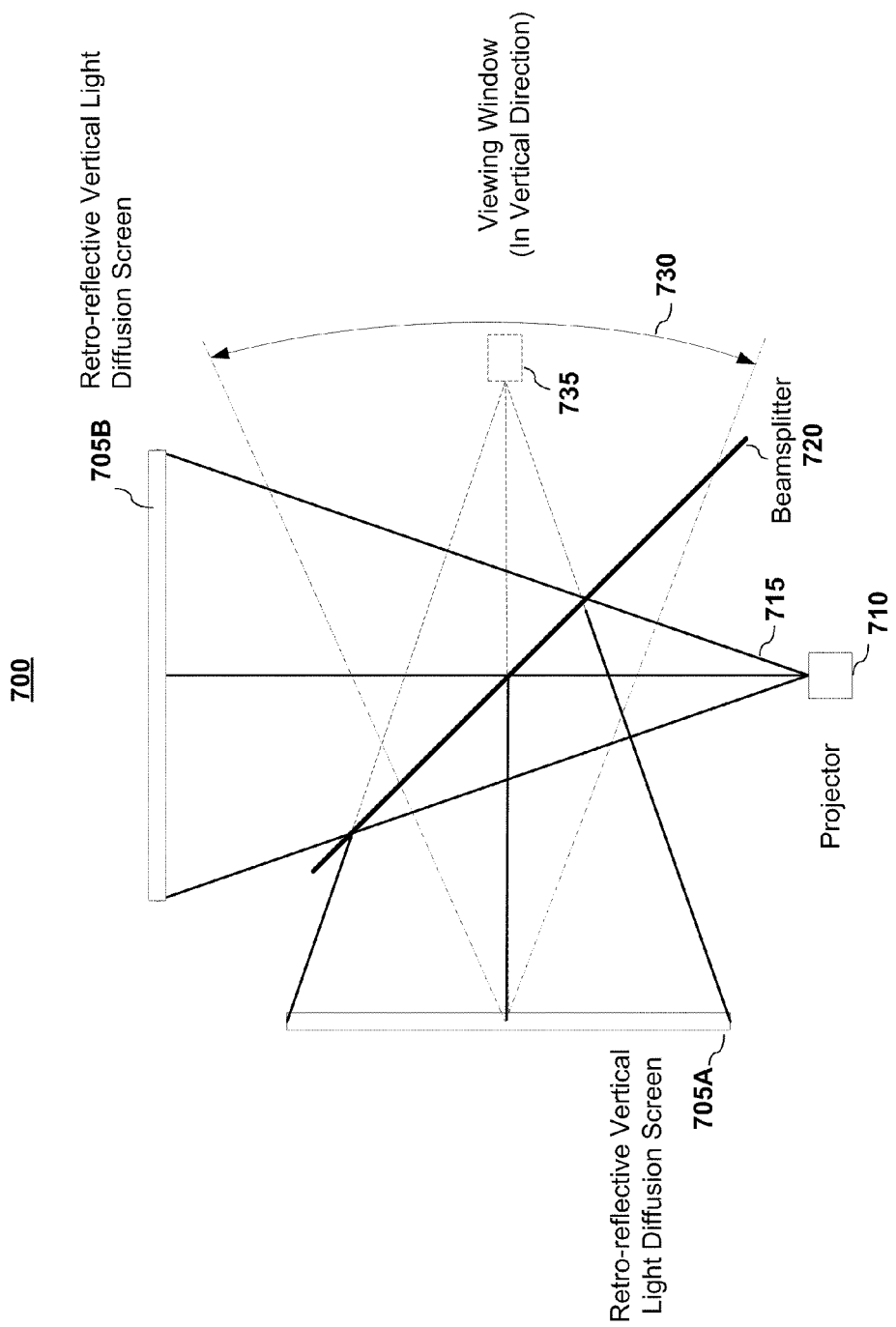
FIG. 7 illustrates another embodiment of a display system with at least one retro-reflective vertical light diffusion screen according to various embodiments of the invention.

Although the embodiment depicted in FIG. 6 creates a more compact design, the resulting image in the viewing window may be perceived as being less bright due to the energy loss as part of the beamsplitting. FIG. 7 illustrates an alternative embodiment of a display system with two retro-reflective vertical light diffusion screens according to various embodiments of the invention to address this light-loss issue.

FIG. 7 depicts a similar configuration 700 as the display system 600 shown in FIG. 6. The depicted display system 700 comprises a retro-reflective vertical light diffusion screen 705A and a projector 710 in the same or similar configuration as the system 600 illustrated in FIG. 6. As noted above, one issue of the display system 600 in FIG. 6 is that approximately half the energy is lost when the light passes through the beamsplitter each time. Thus, approximately 25% of the light actually reaches the user viewing window 630. One solution to this problem is to place a secondary retro-reflective vertical light diffusion screen 705B at a position optically mirror-conjugated with the original screen 705B. This causes the light reflected from the secondary retro-reflective vertical light diffusion screen 705B to add with the light reflected from the primary retro-reflective vertical light diffusion screen 705A that forms the viewing window 730. Thus, using the display system 700 depicted in FIG. 7 can increase the image brightness by a factor of 2 over the display system 600 depicted in FIG. 6.

4. Polarization Managed Display System Embodiments

Figure 8:
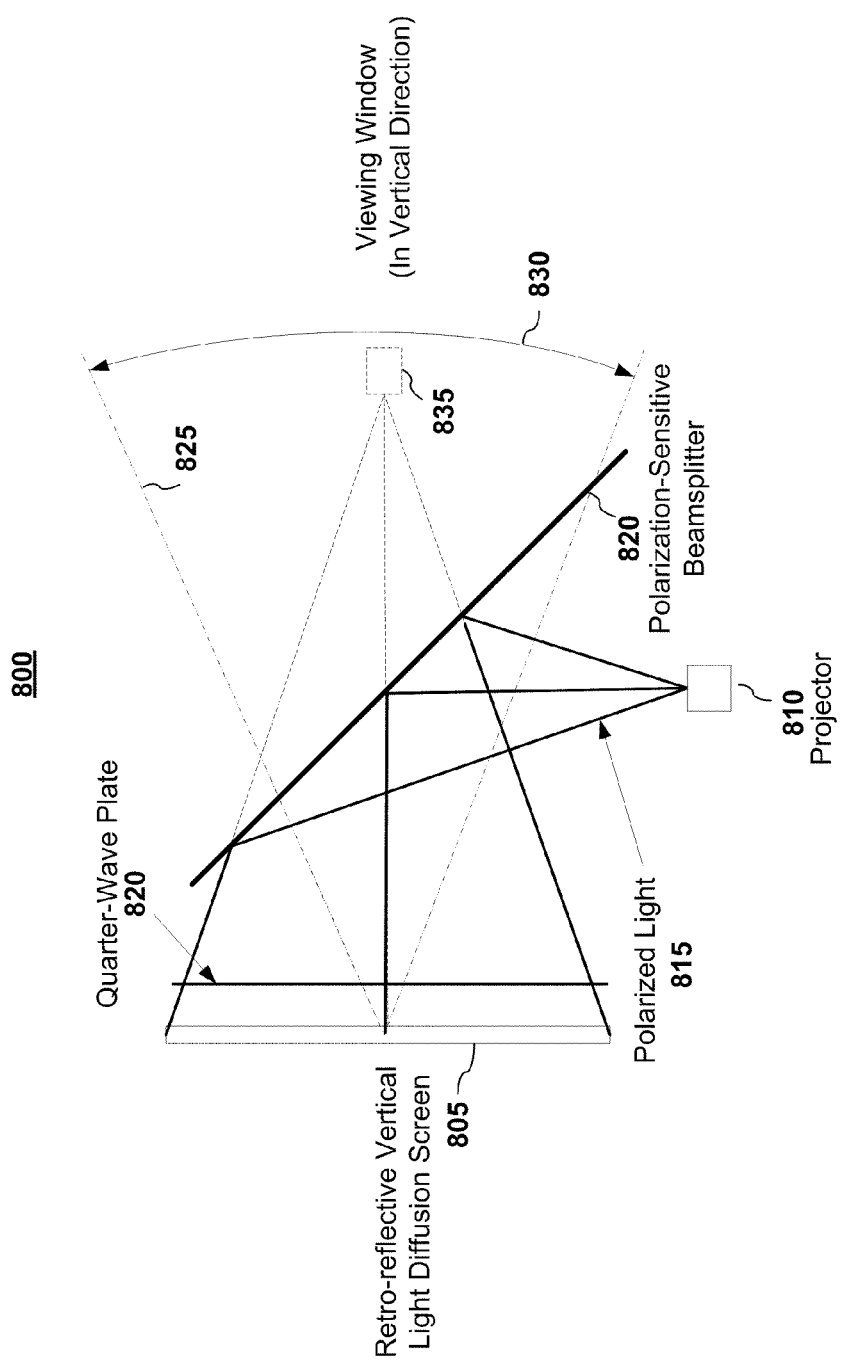
FIG. 8 illustrates yet another embodiment of a display system with a retro-reflective vertical light diffusion screen according to various embodiments of the invention.

FIG. 8 illustrates yet another embodiment of a display system with a retro-reflective vertical light diffusion screen according to various embodiments of the invention. The display system 800 illustrated in FIG. 8 is not only an alternative display system but also provides another solution to the energy loss issue noted with respect the system 600 illustrated in FIG. 6.

FIG. 8 depicts a configuration 800 that is similar to the configuration of the display system 600 shown in FIG. 6. The depicted display system 800 comprises a retro-reflective vertical light diffusion screen 805 and a projector 810 in the same or similar configuration as the system 600 illustrated in FIG. 6. However, as illustrated in FIG. 8, a polarization-sensitive beamsplitter 820 is used. Such a beamsplitter has near 100% reflection rate for polarized light when the light polarization direction matches with the polarization direction of the beamsplitter and near 100% transitivity if the light polarization direction is orthogonal to the polarization direction of the beamsplitter. Thus, after the light 815 is reflected toward the screen 805, a quarter-wave plate 840 is used to rotate the light 45°. When the light is reflected from the screen 805, it is rotated another 45° when it again passes through quarter-wave plate 840. The polarization of the resulting light is orthogonal to the polarization of the light 815 and will pass through the polarization-sensitive beamsplitter 820. Thus, near 100% of the light reaches the user space in the viewing window 830. This approach can increase the image brightness in the viewing window 830 by a factor of 4 over the configuration depicted in FIG. 6.

It shall be noted that the configurations shown in FIGS. 6-8 were depicted with a single projector to simply the explanation. One skilled in the art shall recognize that additional projectors can be added to any of the disclosed systems.

E. Display System Embodiments

Figure 9:
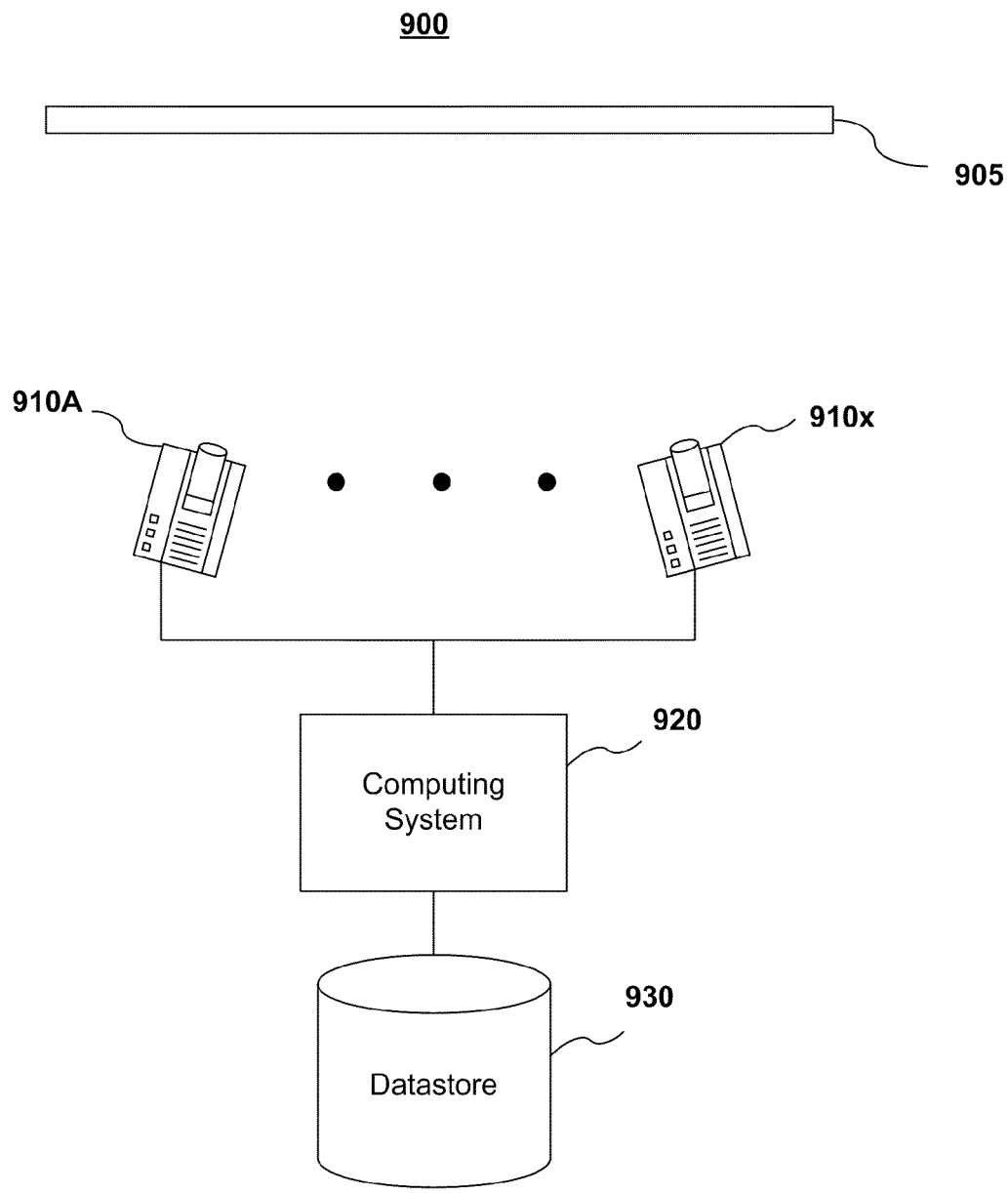
FIG. 9 illustrates a multi-projector display system with at least one retro-reflective vertical light diffusion screen according to various embodiments of the invention.

FIG. 9 illustrates a multi-projector display system with at least one retro-reflective vertical light diffusion screen according to various embodiments of the invention. The system comprises a retro-reflective light diffusion screen 905 and a plurality of projectors 910. In the depicted system 900, the projectors 910A-x may be under the control of a computing system 920. In embodiments, the computing system contains, or alternatively is communicatively connected to, a datastore 930 that stores a set of perspective images. The computing system 920 coordinates the displaying of perspective views on the screen 905 via the projectors 910A-x to generate an autostereoscopic display.

One skilled in the art shall recognize that system depicted in FIG. 9 may be configured in a number of different ways, include without limitation, using one or more of the configurations illustrated in FIGS. 5-8. No particular configuration is critical to the present invention.

It shall be noted that the present invention may be implemented using an instruction-execution/computing device or system capable of processing data, including without limitation, a general-purpose computer and a specific computer, such as one intended for data or image processing. The present invention may also be implemented with other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
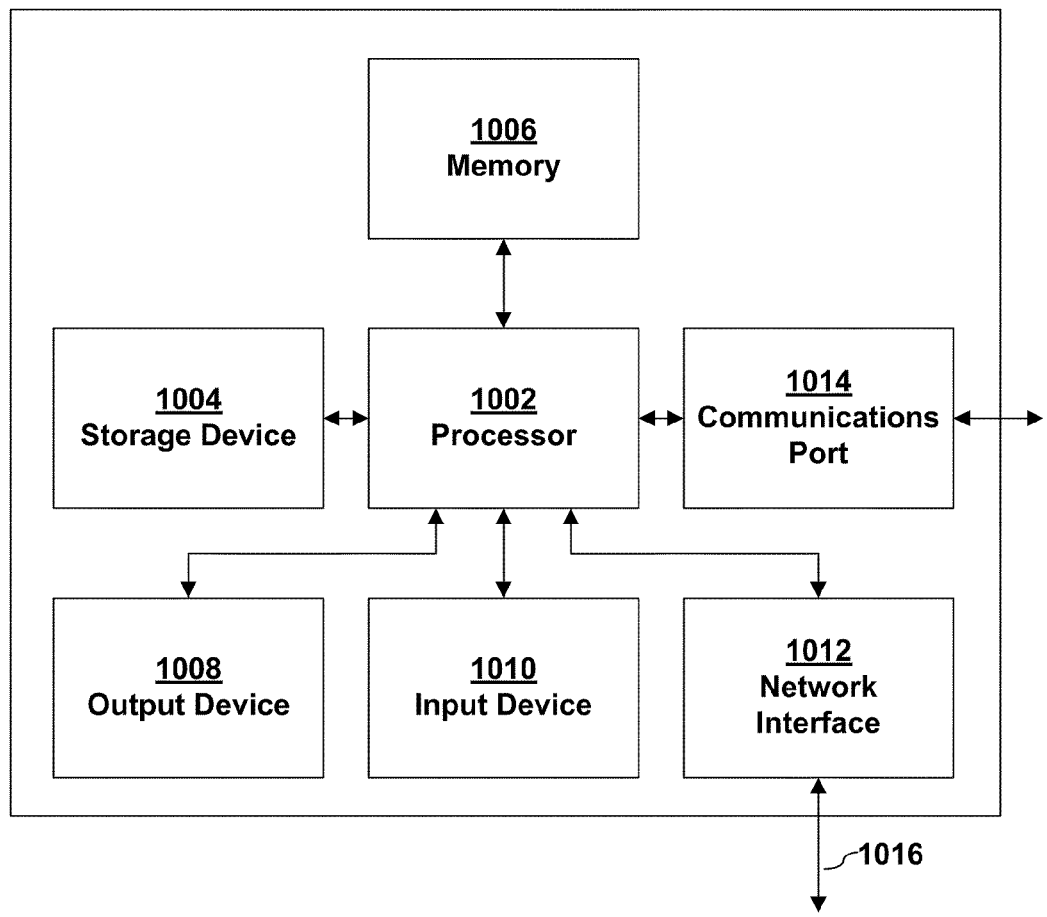
FIG. 10 depicts a block diagram of an example of a computing system according to embodiments of the invention.

FIG. 10 depicts a functional block diagram of an embodiment of an instruction-execution/computing device 1000 that may be implemented with embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In embodiments, possible operating systems include, but are not limited to, UNIX, AIX, LINUX, Microsoft Windows, and the Apple MAC OS. In embodiments, the operating system executes on, and controls the operation of, the computing system 1000. In embodiments, the datastore 930 may be storage 1004.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the software components or modules may be stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a projector, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A system for generating a three-dimensional view of a scene, comprising:
a retro-reflective vertical light diffusion screen having a vertical dimension and a horizontal dimension;
a plurality of projectors generally arranged along the horizontal dimension and positioned to project onto said retro-reflective vertical light diffusion screen, with adjacent projectors projecting different perspective images of said scene;
wherein said retro-reflective vertical light diffusion screen includes:
a retro-reflective layer for reflecting light rays at substantially their incident angle; and
a vertical light diffusion screen for receiving each reflected image from the retro-reflective layer and providing high image diffusion along said vertical dimension and minimal diffusion along said horizontal dimension so as to produce a distinct viewing window elongated along said vertical dimension for each reflected image; and
wherein the image resolution of said system is as high as the resolution of said projectors.

2. A system for generating a three-dimensional view of a scene, comprising:
a retro-reflective vertical light diffusion screen having a vertical dimension and a horizontal dimension;
a plurality of projectors generally arranged along the horizontal dimension and positioned to project onto said retro-reflective vertical light diffusion screen, with adjacent projectors projecting different perspective images of said scene;
wherein said retro-reflective vertical light diffusion screen includes:
a retro-reflective layer for reflecting light rays at substantially their incident angle; and
a vertical light diffusion screen for receiving each reflected image from the retro reflective layer and providing high image diffusion along said vertical dimension and minimal diffusion along said horizontal dimension so as to produce a distinct viewing window elongated along said vertical dimension for each reflected image;
wherein each reflected image's viewing window is centered on the aperture of its corresponding projector's projection lens;
wherein said viewing window is a vertical slit; and
wherein the width of the vertical slit of each viewing window corresponding to a given projector is a function of the horizontal diffusion angle of the retro-reflective vertical light diffusion screen, the distance from the retro-reflective vertical light diffusion screen to the given projector, and the aperture size of the given projector's projection lens, said function defining the following relation for the width of the vertical slit:
$W = D_a + 2 \cdot Z_p \cdot \tan(\overline{\omega}/2)$, where
W is the width of the vertical slit;
$D_a$ is the aperture size of the given projector's projection lens;
$Z_p$ is the distance from the projector to the retro-reflective vertical light diffusion screen; and
$\overline{\omega}$ is the horizontal diffusion angle of the retro-reflective vertical light diffusion screen.

3. A system for generating a three-dimensional view of a scene, comprising:
a retro-reflective vertical light diffusion screen having a vertical dimension and a horizontal dimension;
a plurality of projectors generally arranged along the horizontal dimension and positioned to project onto said retro-reflective vertical light diffusion screen, with adjacent projectors projecting different perspective images of said scene;
wherein said retro-reflective vertical light diffusion screen includes:

a retro-reflective layer for reflecting light rays at substantially their incident angle; and a vertical light diffusion screen for receiving each reflected image from the retro-reflective layer and providing high image diffusion along said vertical dimension and minimal diffusion along said horizontal dimension so as to produce a distinct viewing window elongated along said vertical dimension for each reflected image; and wherein the width of said view windows is wide enough to be viewed through a human user's one eye but too narrow to be simultaneously viewed by the human user's two eyes, and two adjacent viewing windows are spaced to be separately and simultaneously viewable by the human user's corresponding two adjacent eyes, and a viewing zone is defined as two adjacent view windows corresponding to the two eyes of a human user, wherein a left perspective image viewed in the human user's left eye and a right perspective image viewed in the human user's right eye constitutes a specific stereo pair image; and no viewing zone from two view windows repeats a specific stereo pair image.

4. The system of claim 3, wherein said light diffusion screen includes a one-dimensional light diffuser.

5. The system of claim 3, wherein each of said plurality of projectors projects its perspective image in its entirety as a single projection image.

6. The system of claim 5, wherein said system omits mosaicing between projected images.

7. The system of claim 3, wherein said viewing windows are independent of a human user's eye positions.

8. The system of claim 3, wherein said retro-reflective layer reflects each projected perspective image back towards its corresponding projector.

9. The system of claim 3, wherein the vertical diffusion of said vertical light diffusion screen is at least sixty times greater than its horizontal diffusion.

10. The system of claim 3, wherein each reflected image's viewing window is centered on the aperture of its corresponding projector's projection lens.

11. The system of claim 10, wherein said viewing window is a vertical slit.

12. The system of claim 3, wherein the viewing windows have a progression of perspective view images so that any two adjacent viewing windows provide a stereo pair view of the 3D view of said scene.

13. The system of claim 12, wherein any two adjacent view windows provide a stereo pair view of a 3D view of said scene without flipping a left eye perspective image with a right eye perspective image.

14. The system of claim 13, wherein said plurality of projectors includes more than two projectors.

15. The system of claim 13, wherein said plurality of projectors includes at least 6 projectors.

16. The system of claim 3, wherein said projection screen is cylindrical.

17. The system of claim 3, wherein said projection screen is spherical.

18. The system of claim 3, further comprising, a beamsplitter positioned in an optical path between said plurality of projectors and said retro-reflective vertical light diffusion screen to direct a projected images to the screen and to direct the reflected images from the screen to form said view windows at a location different from the location of said plurality of projectors.

19. The system of claim 18, wherein said retro-reflective vertical light diffusion screen is a first screen and the system further comprises:

a second retro-reflective vertical light diffusion screen defining a second screen, said second screen being positioned at an optically mirror-conjugated position relative to the first screen for receiving projected images from the beamsplitter, said beamsplitter combining the reflected images from the first and second screens to form said view windows at said location different from the location of said plurality of projectors.

20. The system of claim 18, wherein the beamsplitter is a polarization-sensitive beamsplitter and the system further includes a quarter-wave plate positioned in an optical path between the retro-reflective vertical light diffusion screen and the beamsplitter.

* * * * *